(12) United States Patent
Ohyama et al.

(10) Patent No.: US 8,996,677 B2
(45) Date of Patent: Mar. 31, 2015

(54) INFORMATION PROCESSING SYSTEM AND PROCESSING METHOD ARRANGEMENTS PROVIDING LOAD DISTRIBUTION AND LEVELING ON DATA COLLECTION UNITS

(71) Applicant: Hitachi, Ltd., Tokyo (JP)

(72) Inventors: Shimpei Ohyama, Ushiku (JP); Yoshinobu Makimoto, Kashiwa (JP); Yuki Masaki, Hitachinaka (JP); Nobuo Saeki, Hitachinaka (JP); Yasuhiro Masuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 12 days.

(21) Appl. No.: 13/758,044

(22) Filed: Feb. 4, 2013

(65) Prior Publication Data

US 2013/0263136 A1 Oct. 3, 2013

(30) Foreign Application Priority Data

Mar. 29, 2012 (JP) ................................. 2012-075913

(51) Int. Cl.
*G06F 15/173* (2006.01)
*G06F 9/46* (2006.01)
*G06F 9/50* (2006.01)

(52) U.S. Cl.
CPC ............... *G06F 9/46* (2013.01); *G06F 9/5027* (2013.01); *G06F 2209/5018* (2013.01); *G06F 2209/5011* (2013.01)
USPC .......................................... 709/223; 709/224

(58) Field of Classification Search
CPC .................... H04L 29/08072; H04L 41/0213
USPC .............................................. 709/223, 224
See application file for complete search history.

(56) References Cited

U.S. PATENT DOCUMENTS 8,620,708 B2 * 12/2013 Miyake et al. ............... 705/7.15
2007/0280165 A1 * 12/2007 Doshi et al. .................... 370/331

FOREIGN PATENT DOCUMENTS

| JP | 9-34540 | 2/1997 |
| JP | 2001-036542 | 2/2001 |
| JP | 2010-198434 | 9/2010 |
| JP | 2012-059215 | 3/2012 |

OTHER PUBLICATIONS

JP Office Action for Japanese Application No. 2012-075913, issued on May 7, 2014.

* cited by examiner

*Primary Examiner* — Andy Ho
(74) *Attorney, Agent, or Firm* — Baker Botts L.L.P.

(57) ABSTRACT

Information processing system including: a plurality of process control units storing process data including present value and time-series data or historical data, and a plurality of data collection units collecting and processing data from the process control units. The data collection units each include: a first dynamic management section managing access and exit of the data collection unit of interest to and from the information processing system and managing operating status of all data collection units currently accessing the information processing system; a second dynamic management section managing addition and removal of process control units to and from the information processing system; and a charge determination section determining process control units to be taken charge of by the data collection unit of interest based on first identification information allocated to each of the data collection units and on second identification information allocated to each of the process control units.

6 Claims, 13 Drawing Sheets

F I G . 3

| DATA COLLECTION UNIT ID | ADDRESS | STATUS INFORMATION |
|---|---|---|
| 2-1 | XXX21 | OPERATIONAL |
| 2-2 | XXX22 | NON-OPERATIONAL |
| ... | ... | ... |
| 2-k | XXX2k | —(THIS UNIT) |
| ... | ... | ... |
| 2-M | XXX2M | OPERATIONAL |

FIG. 4

| PROCESS CONTROL UNIT ID | ADDRESS | LAST SEQUENCE/TIMESTAMP | | | | |
|---|---|---|---|---|---|---|
| | | TREND/HISTORICAL DATA 1 | TREND/HISTORICAL DATA 2 | ... | TREND/HISTORICAL DATA p | |
| 1-1 | XXX11 | X11 | X21 | ... | Xp1 | |
| 1-2 | XXX12 | X12 | X22 | ... | Xp2 | |
| 1-3 | XXX13 | X13 | X23 | ... | Xp3 | |
| 1-4 | XXX14 | X14 | X24 | ... | Xp4 | |
| ... | ... | ... | ... | ... | ... | |
| 1-j | XXX1j | X1j | X2j | ... | Xpj | |
| ... | ... | ... | ... | ... | ... | |
| 1-N | XXX1N | X1N | X2N | ... | XpN | |

INFORMATION PROCESSING SYSTEM AND PROCESSING METHOD ARRANGEMENTS PROVIDING LOAD DISTRIBUTION AND LEVELING ON DATA COLLECTION UNITS

BACKGROUND OF THE INVENTION

1. Field of the Invention

The present invention relates to an information processing system for collecting, treating, and storing process data including present value, time-series data or historical data, as well as to a processing method for use with such an information processing system.

2. Description of the Related Art

FIG. 13 shows an ordinary system configuration of an information processing system (first related-art example) for collecting, treating, and storing process data. In FIG. 13, a data collection unit 52 collects primary process data gathered or generated by as many as N process control units (data sources) 51-1 through 51-N, at a pre frequency over a network 53. After being treated by the data collection unit 52 for secondary use, the process data is stored into a data preservation unit 54 as secondary process data (application data). Using the secondary process data, a data display unit 55 offers the functions of running business applications and of a man-machine interface.

With such an information processing system having the ordinary system configuration, loads tend to concentrate on the data collection unit 52 because the unit 52 alone collects data, treats the primary process data into secondary process data, and stores the treated data into the data preservation unit 54. If the data collection unit 52 fails for some reason and becomes incapable of performing its processes, the secondary process data may be lost or otherwise become defective, which in turn will prevent the data display unit 55 from providing its display.

Generally, the data collection unit 52 may also carry out processes other than the process data collection at a pre frequency between the process control units 51-1 through 51-N on the one hand and the data display unit 55 on the other hand. For example, the other processes may include: transmission of control commands to the process control units 51-1 through 51-N following their input from the data display unit 55; acquisition of real-time data from the process control units 51-1 through 51-N in keeping with requests from the data display unit 55; periodical treatment of secondary data collected in hourly increments into tertiary process data arranged in daily increments or of secondary data collected in daily increments into tertiary data arranged in monthly increments, and storage of the tertiary process data. In such cases, the loads concentrate on the data collection unit 52 collecting the process data at a pre frequency. This can exhaust the CPU, memory, and other resources of the data collection unit 52 and prevent the unit 52 from doing anything other than the process data collection.

Because the data collection unit 52 alone collects data, treats primary process data into secondary process data, and stores the treated data into the data preservation unit 54, the unit 52 needs to be improved in processing performance. In order to improve its performance, the data collection unit 52 generally needs to be stopped to have its resources (CPU, memory, etc.) reinforced; the performance of the unit 52 cannot be enhanced dynamically while the system as a whole is in operation. In this context, the processing performance is an indicator indicating at which frequency data can be collected from the process control units 51-1 through 51-N, treated, and stored.

That is, so as not to stop the system, the data collection unit 52 needs to incorporate beforehand sufficient resources (CPU, memory, etc.) to provide desired processing performance in the face of a predetermined maximum number of configured process control units as the targets from which to collect data, so that the process control units may be increased in number over time and still dealt with adequately. Thus the data collection unit 52 cannot be adjusted dynamically in performance in keeping with the increasing or decreasing number of target process control units (data sources) configured.

FIG. 14 shows another configuration (second related-art example) in which the technique disclosed in JP-9-34540-A is applied to the above-outlined ordinary system (FIG. 13). This related-art technique involves replicating the data collection unit 62 into individual data collection units 62-1 through 62-M each allocated a predetermined priority in advance. Of all the currently operating data collection units, the one with the highest priority is regarded as a collection master (data collection unit 62-1 in FIG. 14) and the one with the next-highest priority as a collection slave (data collection unit 62-M in the figure), whereby all process data are collected and stored. According to this technique, the currently operating data collection units other than the collection master and collection slave are placed in a standby state. If the collection master or the collection slave fails, another collection master and another collection save are selected according to the priority.

FIG. 15 shows yet another configuration (third related-art example) in which the technique disclosed in JP-2010-198434-A is applied to the above-outlined ordinary system (FIG. 13). This related-art technique involves integrally replicating the data collection unit and data preservation unit into individual data collection units and data preservation units, so that all data collection units may share configuration information 76 about themselves and about the process control units (i.e., nodes) that they target for data collection. According to this technique, the data collection units collect and store data from the targeted process control units (nodes) based on the configuration information 76. Also on the basis of the configuration information 76, the data display unit 75 determines which of the data collection units 72-A and 72-B (with data preservation units 74-A and 74-B) stores necessary secondary process data (application), and sends a query to the applicable data collection unit (data preservation unit).

SUMMARY OF THE INVENTION

With the technique disclosed in JP-9-34540-A, the data collection unit that actually performs processing is determined from among all replicated data collection units according to the priority. However, this technique does not deal with load distribution or load leveling. With the technique disclosed in JP-2010-198434-A, the configuration information specifying the relations between the data collection units and the process control units (nodes) targeted thereby is established beforehand. As such, the configuration information is static and fixed and does not take into account any dynamic increase or decrease in the number of configured data collection units and process control units (nodes).

It is therefore an object of the present invention to overcome the above and other deficiencies of the related art and to provide an information processing system and a processing method for use therewith whereby the loads on data collection units collecting, treating, and storing process data are distributed and leveled.

It is another object of the present invention to provide an information processing system and a processing method for use therewith whereby the processing performance of collecting, treating and storing process data is improved dynamically and easily.

In carrying out the present invention, and according to one embodiment thereof, there is provided an information processing system including: a plurality of process control units which store process data including present value and time-series data or historical data, and a plurality of data collection units which collect the process data from the process control units over a network and which process the collected process data. The data collection units each include: a first dynamic management section which manages access and exit of the data collection unit of interest to and from the information processing system and operating status of all the data collection units currently accessing the information processing system; a second dynamic management section which manages the addition and removal of the process control units to and from the information processing system, and a charge determination section which determines the process control units to be taken charge of by the data collection unit of interest based on first identification information allocated to each of the data collection units and on second identification information allocated to each of the process control units.

According to the present invention, it is possible to implement an information processing system and processing method for use therewith whereby the loads on the configured data collection units collecting, treating and storing process data are distributed and leveled in such a manner that the processing performance of the system may be improved dynamically and easily.

BRIEF DESCRIPTION OF THE DRAWINGS

Other objects and advantages of the invention will become apparent from the following description of embodiments with reference to the accompanying drawings in which:

FIG. 3 is an explanatory view showing a typical data collection unit management table;

FIG. 4 is an explanatory view showing a typical process control unit management table;

DESCRIPTION OF THE PREFERRED EMBODIMENTS

Some preferred embodiments of the information processing system and the processing method for use therewith according to the present invention are described below in detail by reference to the accompanying drawings.

Embodiments

Figure 1:
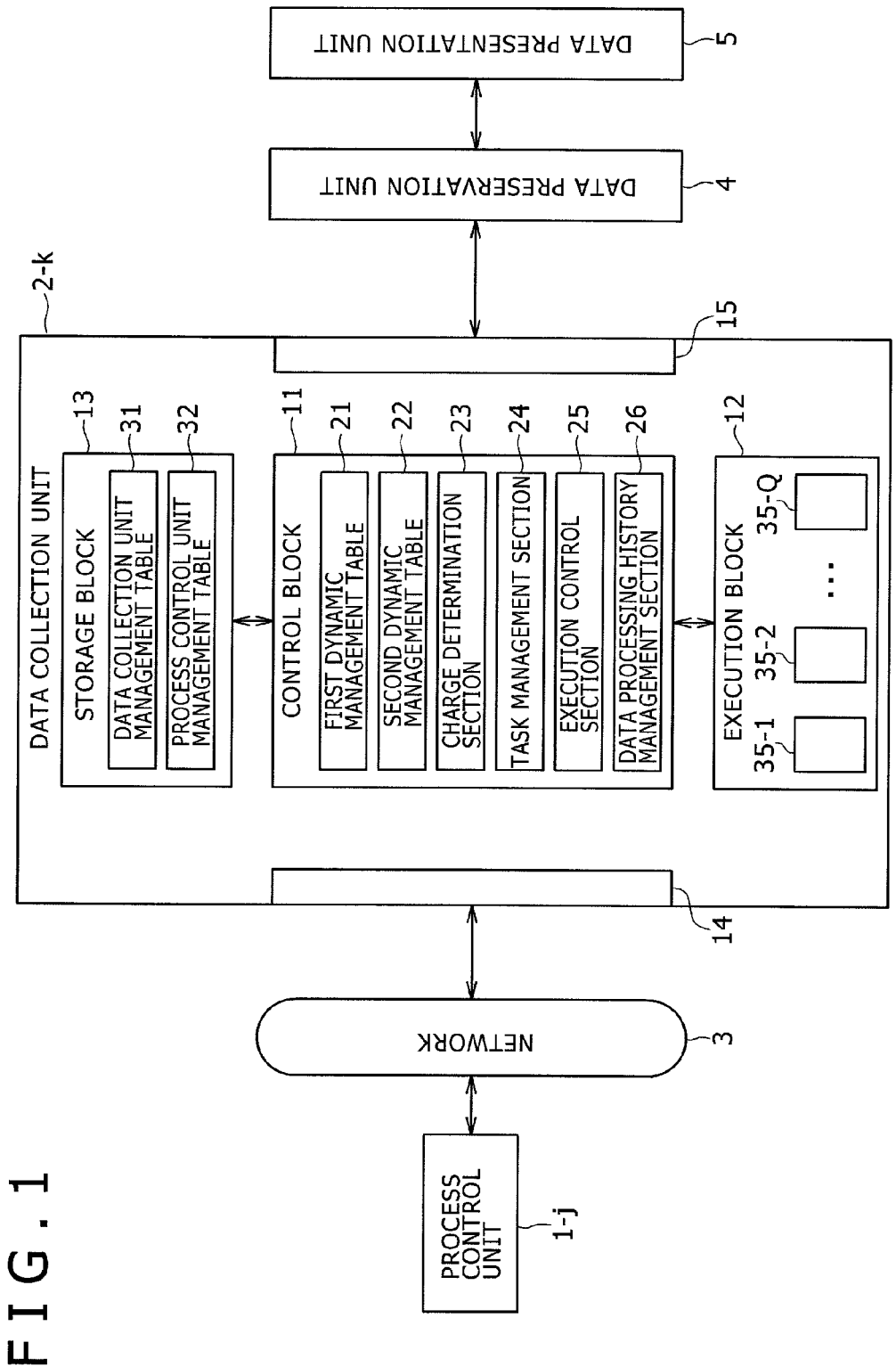
FIG. 1 is a block diagram of an information processing system as one embodiment of the present invention.
Figure 2:
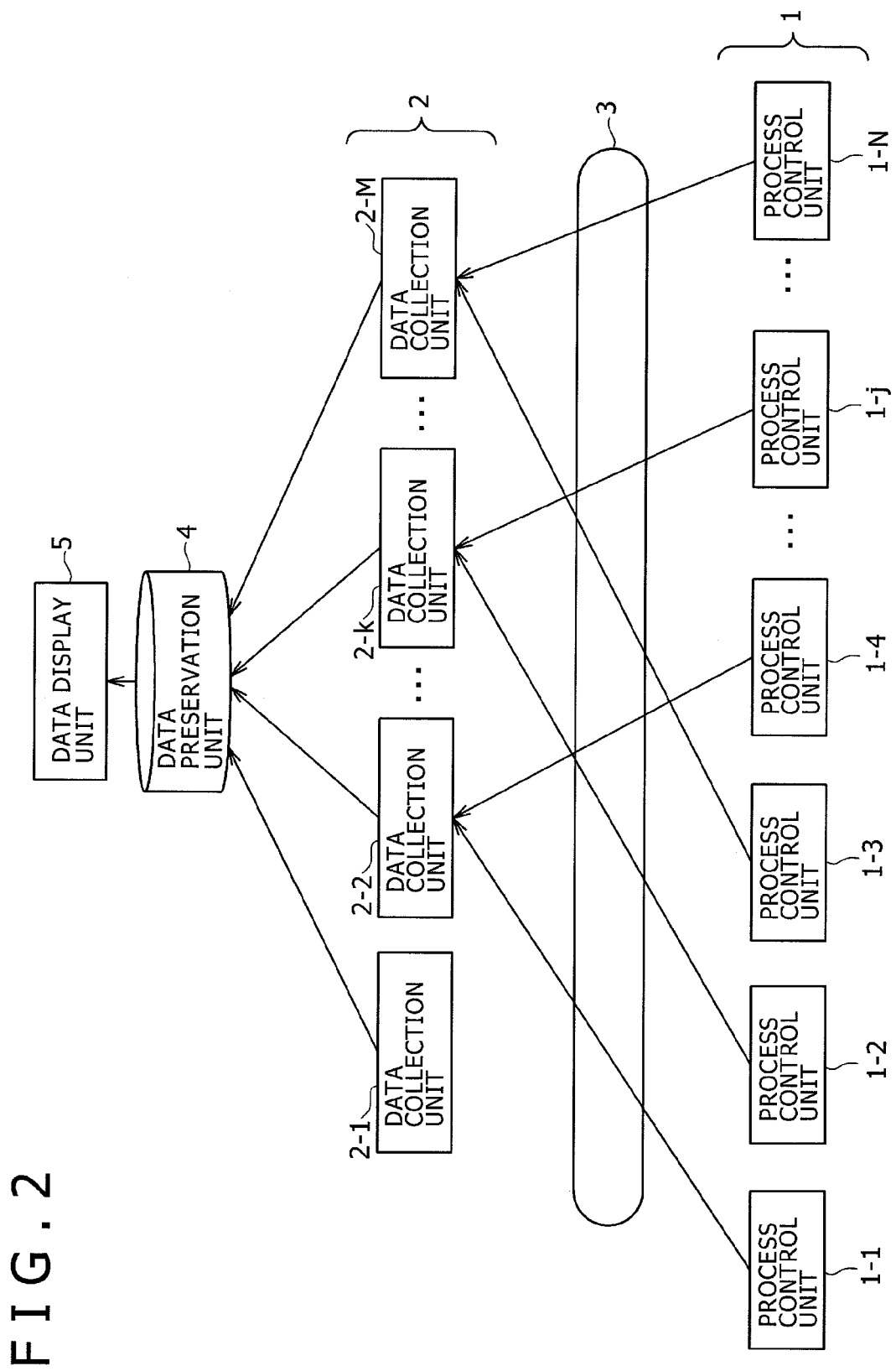
FIG. 2 is a block diagram showing a typical overall configuration of the information processing system embodying this invention.

FIG. 1 is a block diagram of an information processing system as one embodiment of the present invention, primarily depicting an internal structure of a data collection unit. FIG. 2 is a block diagram showing a typical overall configuration of the information processing system embodying this invention.

In FIGS. 1 and 2, the information processing system embodying the invention has a group 1 of N process control units (1-1 through 1-N; N is a positive integer of at least 2) and a group 2 of M data collection units 2 (2-1 through 2-M; M is a positive integer of at least 2) interconnected with one another via a network 3, the group 2 of M data collection units being connected to a data preservation unit 4 which in turn is connected to a data display unit 5. In the ensuing description, it is assumed that the process control unit count N and the data collection unit count M have the relationship of N>M or N>>M therebetween.

Here, the process control unit group 1 constitutes data sources for the data collection unit group 2. Each process control unit collects or internally generates process data including various present value and time-series data or historical data. The data collection unit group 2 collects primary process data gathered or internally generated by the process control unit group 1, at a predetermined frequency via the network 3, and treats the collected data for secondary use. The frequency of data collection may be determined by process data category. The primary process data collected by the data collection unit group 2 and the secondary process data (application data) treated thereby are stored into the data preservation unit 4. Using the secondary process data, the data display unit 5 offers the functions of running business applications and of a man-machine interface.

That is, the data collection unit is replicated into a plurality of data collection units that collect, via the network 3, the primary process data stored by the process control units (data sources) 1-1 through 1-N and treat the collected data into secondary process data (application data) usable by the data display unit 5. The secondary process data is then stored into the data preservation unit 4. In the ensuing description, the series of collection, treatment, and storage of data will be referred to as "processing of process data."

Also in FIG. 1, the data collection unit 2-$k$ ($k$=1 to M) is structured to include a control block 11, an execution block 12, a storage block 13, and input/output blocks 14 and 15. The storage block 13 includes a data collection unit management table 31 and a process control unit management table 32. The control block 11 includes a first dynamic management section 21, a second dynamic management section 22, a charge determination section 23, task management section 24, an execution control section 25, and a data processing history management section 26. The execution block 12 performs the processing of process data, is implemented using a processor such as MPU (micro-processing unit), and possesses as many as Q processing resources 35-1 through 35-Q (Q is any positive integer). The input/output block 14 provides a communication interface with the process control unit group 1 primarily via the network 3, and the input/output block 15 provides a communication interface with the data preservation unit 4.

Explained next are the functions of the components making up the control block 11 and storage block 13.

The first dynamic management section 21 manages the access and exit of the data collection unit 2-*k* to and from the information processing system and the operating status of all data collection units that access the information processing system. The access or exit of the data collection unit 2-*k* to or from the system is accomplished by adding or deleting applicable data to or from the data collection unit management table 31. That is, managing the operating status of the data collection units means managing the status of all data collection units 2-1 through 2-M operating or not operating, including their life-and-death management. The operating status of the data collection units is registered and updated successively in the data collection unit management table 31 for management purposes.

As shown in FIG. 3, the data collection unit management table 31 stores status information which indicates, for each of all data collection units 2-1 through 2-M accessing the information processing system, a data collection unit ID (first identification information), an address of the data collection unit of interest on the network 3, and operating status of that data collection unit (operating or not operating). For purpose of explanation in the ensuing description, the first identification information will be composed of the data collection unit ID's represented by the unmodified reference characters 2-1 through 2-M of the data collection units. However, the first identification information is not limited to the data collection unit ID's; any name, number, etc., that uniquely identifies each data collection unit may be used instead as the first identification information.

The first dynamic management section 21 manages the operating status of all data collection units by successively updating the registered content of the data collection unit management table 31 through periodical queries to the other data collection units via the network 3. For example, if a new data collection unit other than the data collection units 2-1 through 2-M is to access the information processing system, new data is added to the table in response to an addition request from the newly accessing data collection unit. If any one of the data collection units 2-1 through 2-M is to exit the information processing system, corresponding data is deleted from the table in response to a deletion request from the exiting data collection unit.

The second dynamic management section 22 manages the addition or removal of the process control unit 1-*j* (j=1 to N) to or from the information processing system. The addition or removal of the process control unit 1-*j* to or from the system is accomplished by adding or deleting relevant data to or from the process control unit management table 32, respectively.

As shown in FIG. 4, the process control unit management table 32 stores the process control ID's (second identification information) of all process control units 1-1 through 1-N possessed by the information processing system, their addresses on the network 3, and sequence/timestamp information possessed by the process control units as processing history information by data category. In the description that follows, as with the first identification information, the second identification information will be composed of the reference characters 1-1 through 1-N of the process control units used unmodified as the process control unit ID's. However, the second identification information is not limited to the process control unit ID's; any name, number or the like that uniquely identifies each process control unit may be used instead.

The second dynamic management section 22 successively updates the registered content of the process control unit management table 32 by periodically querying all process control units via the network 3, thereby managing all process control units possessed by the information processing system.

The charge determination section 23 autonomously determines the process control units to be taken charge of by the data collection unit 2-*k* of interest (this unit) based on the first identification information allocated to each of the M data collection units 2-1 through 2-M (data collection unit ID's in the data collection unit management table 31) and on the second identification information allocated to each of the N process control units 1-1 through 1-N (process control unit ID's in the process control unit management table 32).

It is assumed here that the rules for determining the charge are common to the data collection units 2-1 through 2-M and that any data collection unit accessing the information processing system is notified of the rules together with data collection unit configuration information from a designated data collection unit. The rules used by this embodiment are composed of a sequential allocation algorithm by which the process control units making up the group 1 and arranged in order of their process control unit ID's (second identification information) are allocated sequentially to the data collection units constituting the group 2 and arranged in order of their data collection unit ID's (first identification information).

The task management section 24 manages the processing about process data as tasks being queued. That is, the task management section 24 handles as one task the collection of primary data from a given process control unit (data source) 1-*j*, treatment of the collected primary data into secondary data, and storage of the secondary data into the data preservation unit 4, and places the task under queue management. Although this embodiment adopts a first-in, first-out (FIFO) scheme as the method for task management, this is not limitative of the present invention. Any other method may be used instead as long as it allows the tasks to be extracted a predetermined number at a time according to the predetermined rules.

The execution control section 25 performs pooled management of a predetermined number of executable threads from among the threads possessed by the execution block 12, and allocates the task extracted successively from the task management section 24 to an executable thread. It should be noted that the increment of processing by the execution block 12 is not limited to a thread; a process may be used instead as the increment of processing.

The data processing history management section 26 stores processing history information as the sequence/timestamp information in the process control unit management table 32, the processing history information indicating by data category how much the time-series data or the historical data within the process data has been completed when processed over time (i.e., series of collection, treatment, and storage of data). Upon execution of a task, the data processing history management section 26 performs a chronologically consistent continuation process based on the processing history information. At the end of the task execution, the data processing history management section 26 updates the processing history information.

Explained below in reference to FIGS. 5 through 12 is the method of processing carried out by the information processing system that includes the components discussed above.

Figure 5:
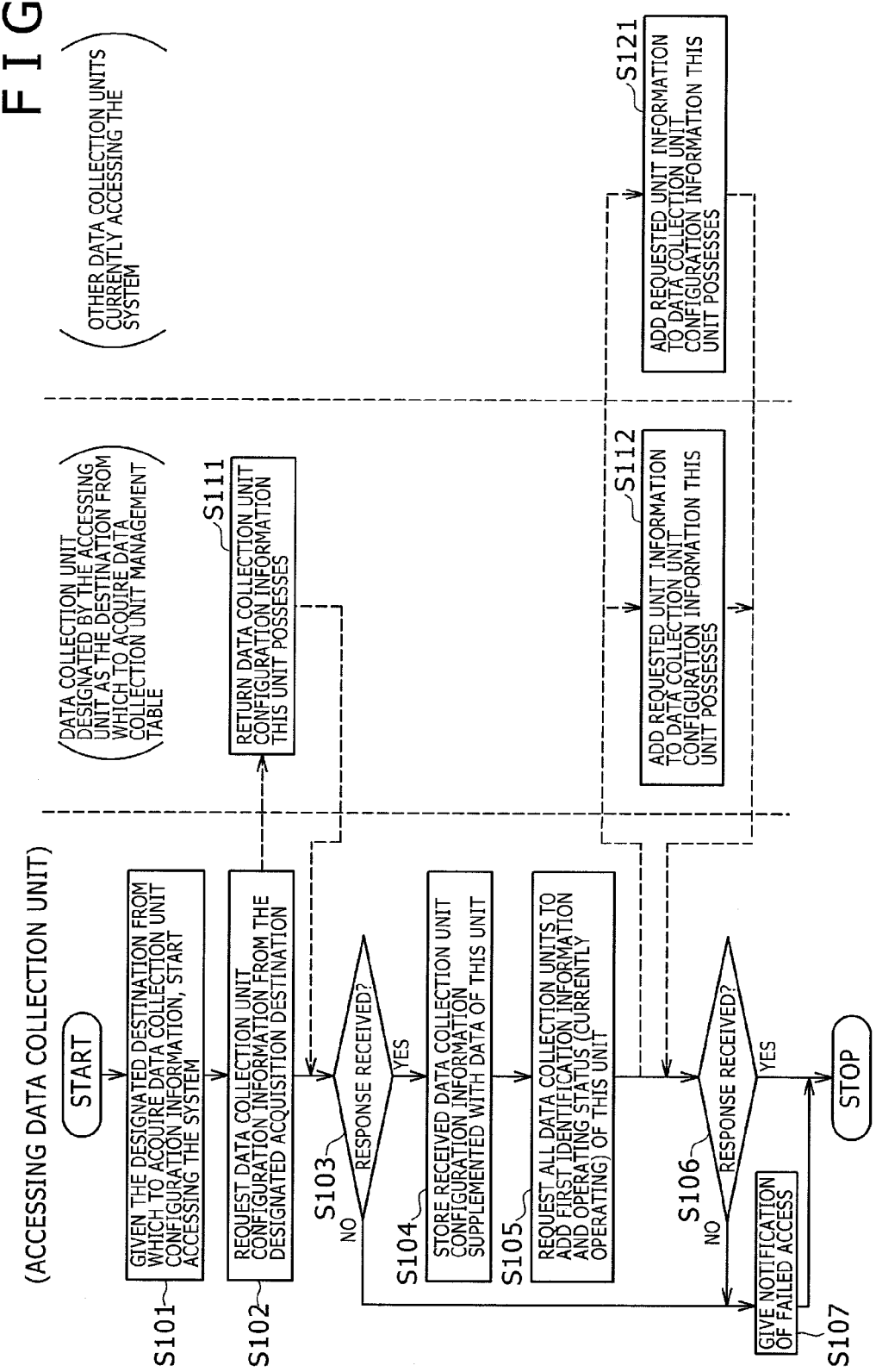
FIG. 5 is a flowchart explaining the procedure for a data collection unit to access the information processing system.

First, the procedure for the data collection unit 2-$k$ to attempt access to the information processing system is explained in reference to the flowchart of FIG. 5. It is assumed here that the accessing data collection unit 2-$k$ is already in possession of the address, on the network 3, of at least one data collection unit in the group 2 of the data collection units currently accessing the information processing system. There may be diverse ways to obtain the address: the operator of this data collection unit 2-$k$ may operate the first dynamic management section 21 to designate the address; the first dynamic management section 21 may query the data preservation unit 4 to acquire the address; or the system administrator may designate and announce the address through the data display unit 5, for example.

The first dynamic management section 21 of the data collection unit 2-$k$ starts accessing the information processing system by identifying the data collection unit having the address acquired as explained above, as the destination from which to acquire configuration information (step S101). The data collection unit 2-$k$ requests configuration information about the information processing system from the data collection unit that possesses the information and has been designated as the destination from which to acquire the configuration information (step S102). In this context, the configuration information is the content of the data collection unit management table 31.

Upon receipt of the request from the data collection unit 2-$k$, the data collection unit designated as the configuration information acquisition destination returns the configuration information that this unit possesses about the data collection units configured in the information processing system, i.e., the content of the data collection unit management table 31 (step S111).

After requesting the configuration information, the data collection unit 2-$k$ determines whether a response has been received within a predetermined time period from the data collection unit designated as the information acquisition destination step S103). If no response has been received within the predetermined time period, the data collection unit 2-$k$ determines that the access attempt has failed and notifies the operator thereof (step S107).

If a response has been received within the predetermined time period from the data collection unit 2-$k$ designated as the information acquisition destination, the accessing data collection unit adds its own data collection unit ID (first identification information) and the data of its address on the network 3 to the received configuration information, before writing the received information to the data collection unit management table 31 of the data collection unit 2-$k$ for storage (step S104).

The accessing data collection unit then transmits its own data collection unit ID (first identification information) and the data of its address and its operating status (currently operating) to all other data collection units currently accessing the information processing system, and requests each of the data collection units to add the transmitted data to their data collection unit management tables 31 (step S105).

Meanwhile, given the request to add the information from the data collection unit 2-$k$, all other data collection units currently accessing the information processing system add the operating status information about the data collection unit 2-$k$ to their data collection unit management tables 31, and return a response saying that the unit information has been added to their configuration information (steps S112 and step S121).

After making the request to add the information, the data collection unit 2-$k$ determines whether a response has been received within a predetermined time period from all other data collection units (step S106). If the response has been received within the predetermined time period from all other data collection units, the accessing data collection unit terminates this procedure. If the response has not been received within the predetermined time period, the accessing data collection unit 2-$k$ determines that the attempt to synchronize the configuration information has failed and notifies the operator of the failure to add this data collection unit dynamically to the system (step S107).

Figure 6:
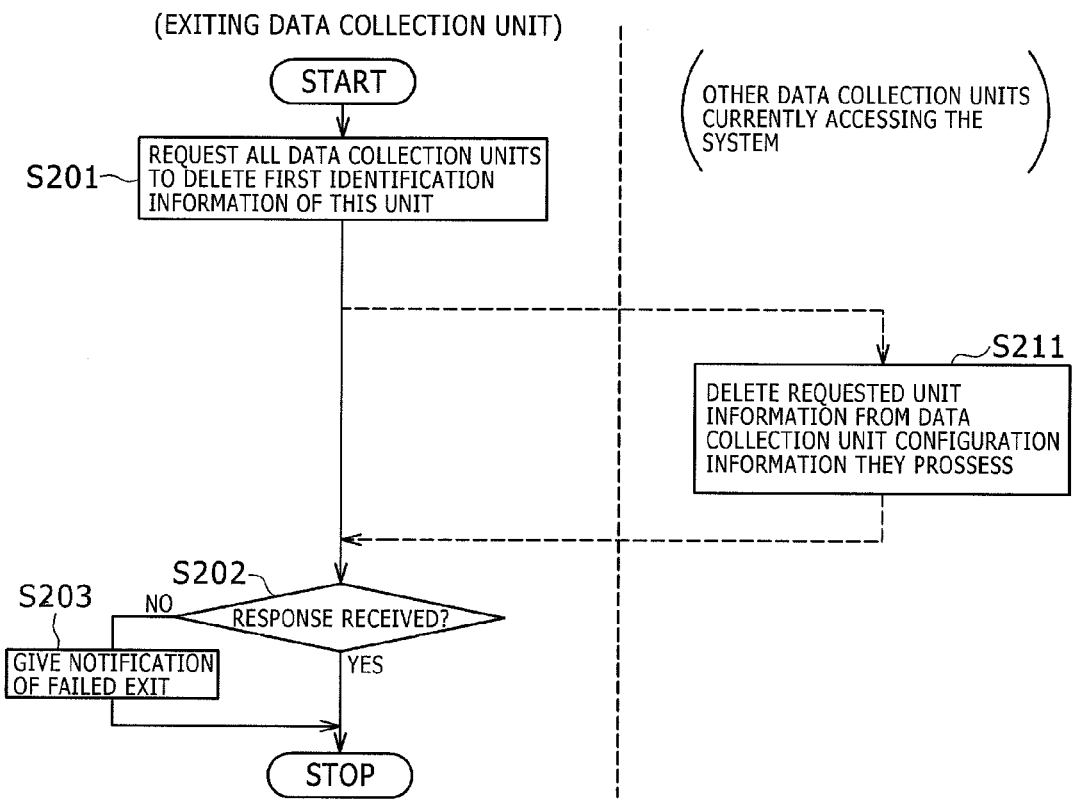
FIG. 6 is a flowchart explaining the procedure for a data collection unit to exit the information processing system.

Explained next in reference to the flowchart of FIG. 6 is the procedure for the data collection unit 2-$k$ to exit the information processing system. The first dynamic management section 21 of the data collection unit 2-$k$ transmits via the network 3 its own data collection unit ID (first identification information) to all other data collection units currently accessing the information processing system, and requests these data collection units to delete from their data collection unit management tables 31 the operating status information about the data collection unit 2-$k$ (step S201).

Upon receipt of the deletion request from the data collection unit 2-$k$, all other data collection units currently accessing the information processing system deletes the operating status information about the data collection unit 2-$k$ from their data collection unit management tables 31, and give a response saying that the unit information has been deleted from their configuration information (step S211).

After making the deletion request, the data collection unit 2-$k$ determines whether a response has been received within a predetermined time period from all other data collection units (step S202). If the response has been received within the predetermined time period from the other data collection units, the data collection unit 2-$k$ terminates this procedure. If no response has been received within the predetermined time period, the data collection unit 2-$k$ determines that the attempt to synchronize the configuration information has failed and notifies the operator of the failure to delete the data collection unit dynamically (step S203).

Figure 7:
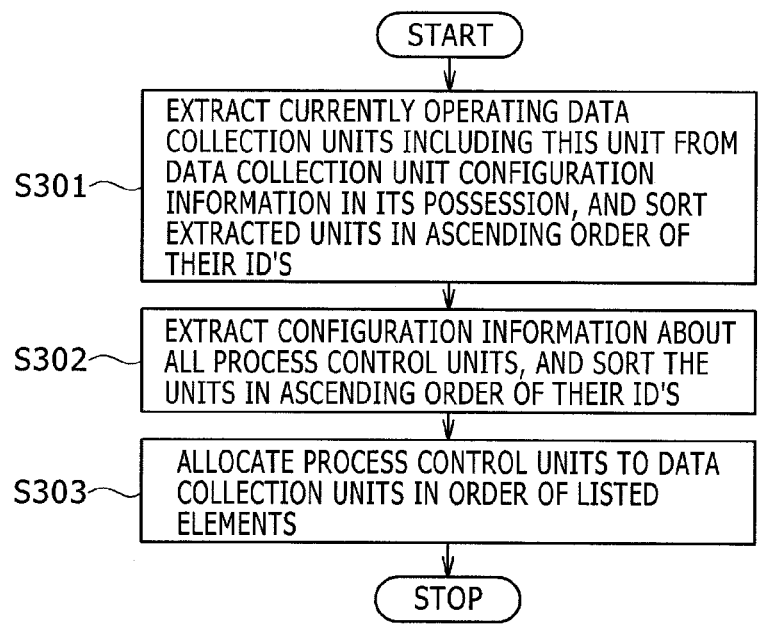
FIG. 7 is a flowchart explaining the procedure for determining the process control units to be taken charge of by the data collection unit.
Figure 8:
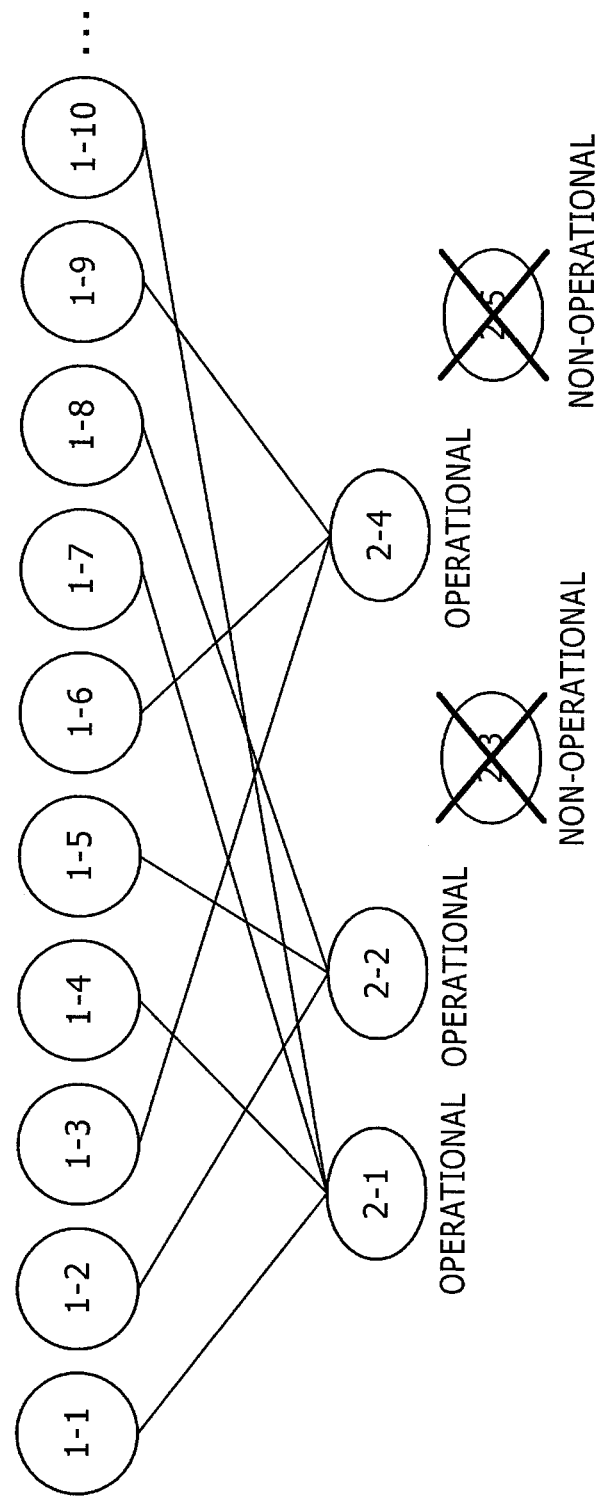
FIG. 8 is an explanatory view explaining how the charges of the data collection unit are typically determined.

The procedure for the data collection unit 2-$k$ to take charge of process control units is explained next in reference to the flowcharts of FIGS. 7 and 8. FIG. 8 is an explanatory view explaining how the charges of the data collection unit are typically determined. In FIG. 8, circles each denote a process control unit and ellipses each represent a data collection unit. The numbers in the circles and ellipses indicate the ID's (identification information) of the units.

The charge determination section 23 of the data collection unit 2-$k$ first extracts all currently operating data collection units, including the own unit, from the data collection unit configuration information (i.e., data collection unit management table 31) possessed by the unit 2-$k$, and sorts the extracted data collection units in ascending order of their ID's (first identification information) to make a list of the data collection unit group 2 (step S301). In the example of FIG. 8, the data collection units 2-3 and 2-5 are not operating, so that the data collection units 2-1, 2-2 and 2-4 are sorted in ascending order of their ID's.

Next, the charge determination section 23 extracts all process control units currently accessing the information processing system from the process control unit configuration information (i.e., process control unit management table 32), and sorts the extracted process control units in order of their ID's (second identification information) to make a list of the process control unit group 1 (step S302). In the example of FIG. 8, the process control units 1-1 through 1-10, . . . are sorted in ascending order of their ID's.

The elements making up the list of the process control unit group 1 are allocated successively to the elements constituting the list of the data collection unit group 2 (step S303). In the example of FIG. 8, the process control units 1-1, 1-4, 1-7, 1-10, . . . are allocated to the data collection unit 2-1; the process control units 1-2, 1-5, 1-8, . . . are allocated to the data collection unit 2-2; the process control units 1-3, 1-6, 1-9, . . . are allocated to the data collection unit 2-4, and so on.

Figure 10:
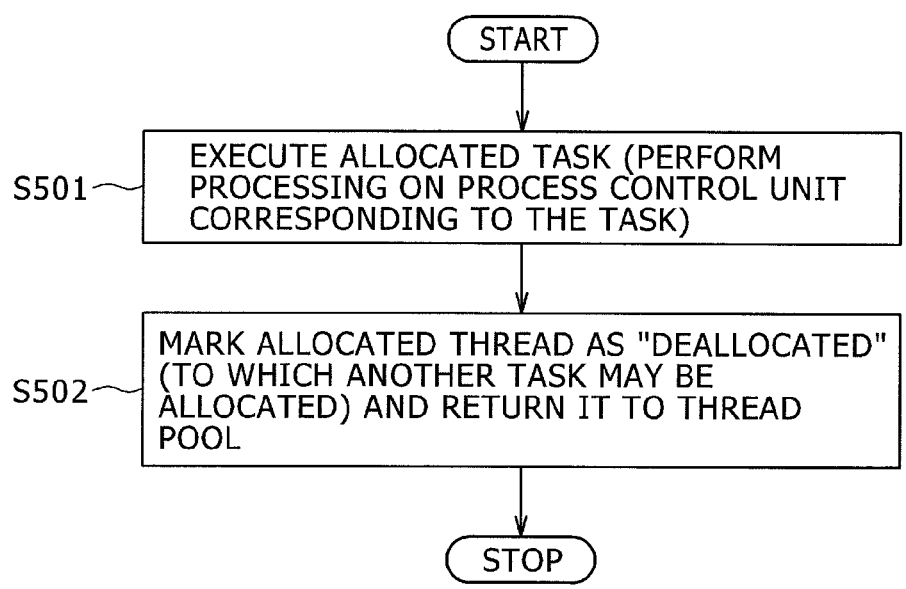
FIG. 10 is a flowchart explaining the procedure for executing a task and deallocating a thread.
Figure 11:
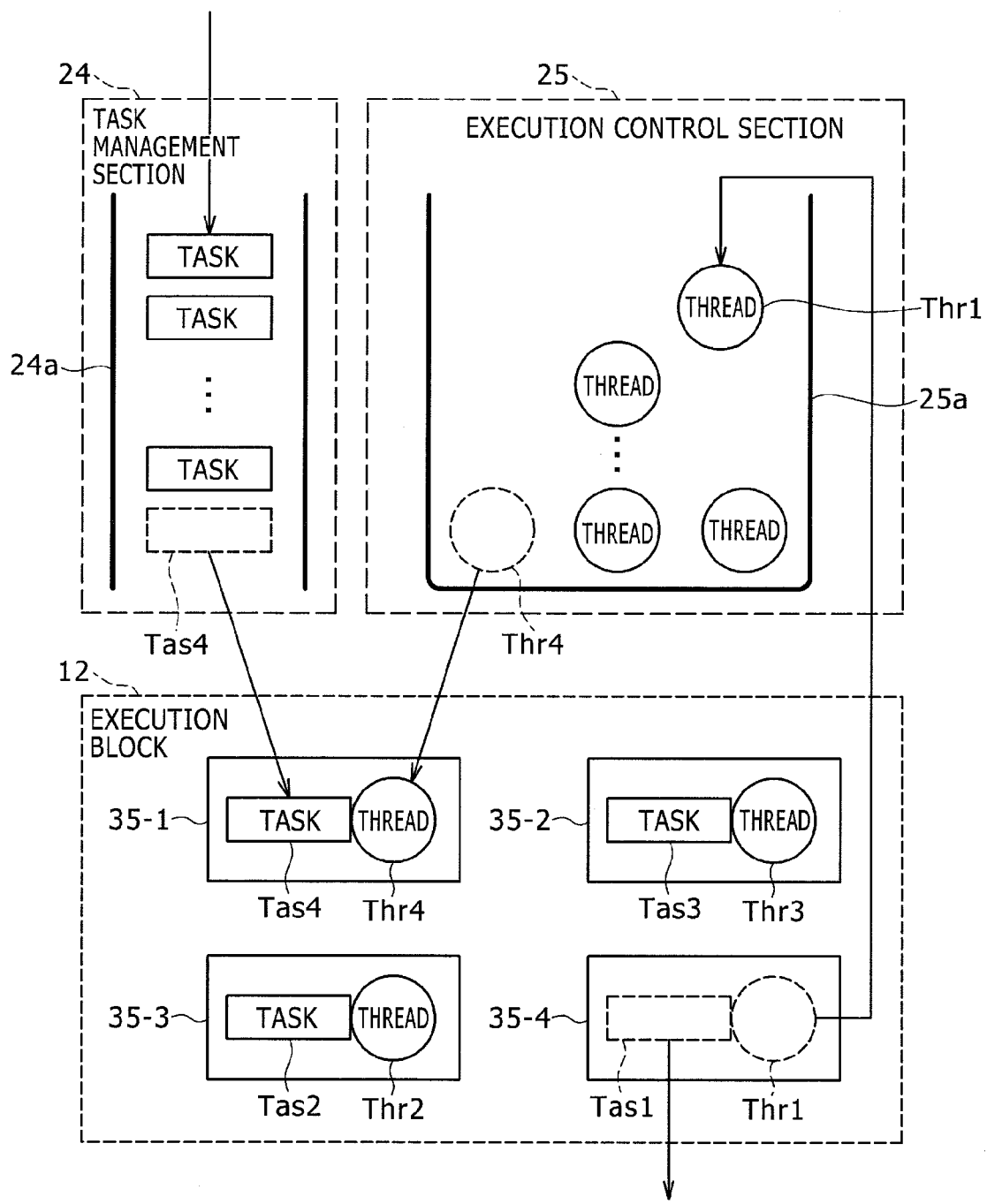
FIG. 11 is an explanatory view explaining how an execution control section typically allocates tasks to threads.

Explained next in reference to the flowcharts of FIGS. 9 and 10 and to FIG. 11 are the procedures for allocating tasks to threads, for executing the tasks, and for deallocating the threads. FIG. 11 is an explanatory view explaining how the execution control section 25 typically allocates tasks to threads. The task management section 24 has a task queue 24a, the execution control section 25 has a thread pool 25a, and the execution block 12 has processing resources 35-1 through 35-4 (Q=4).

Figure 9:
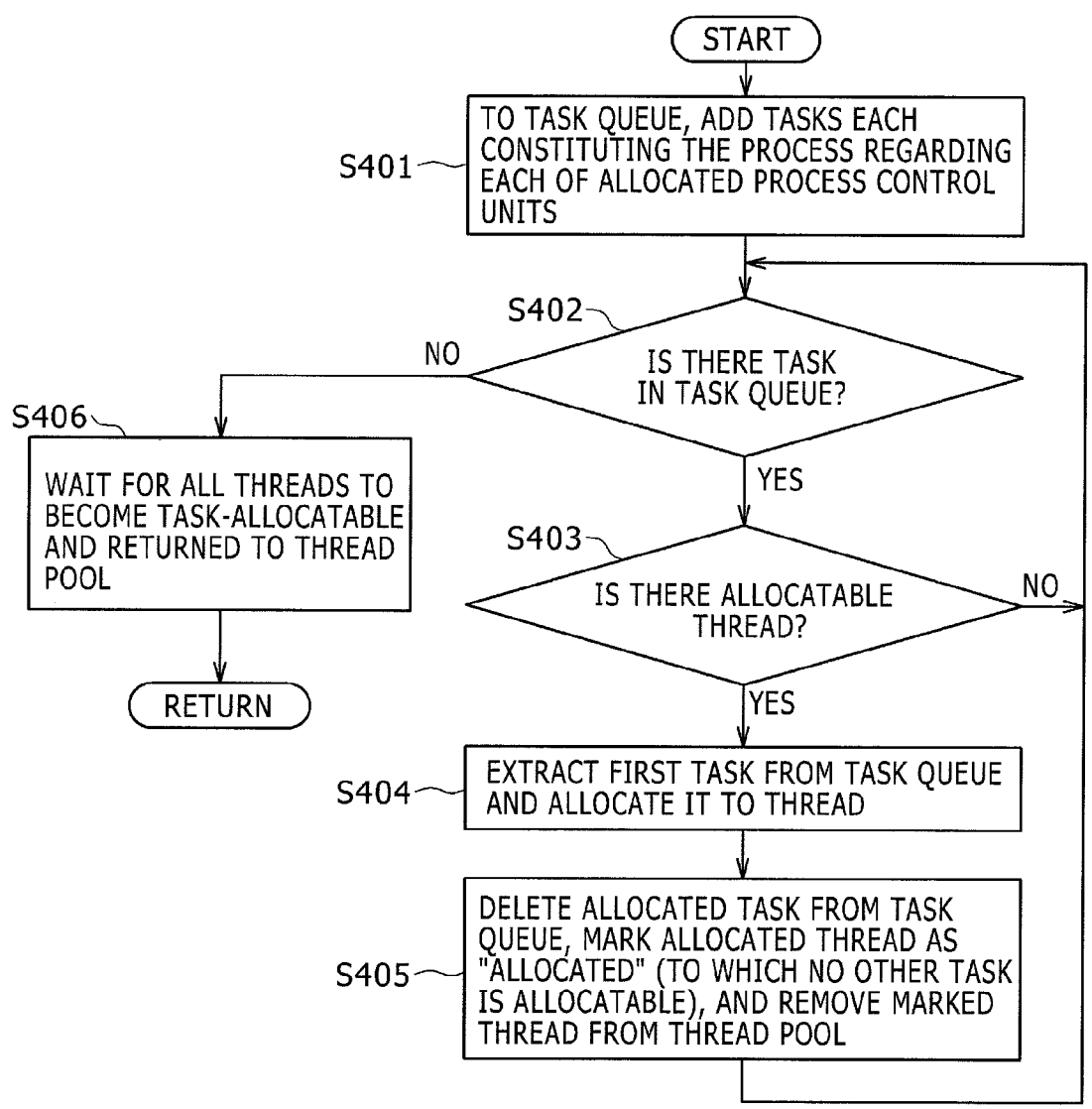
FIG. 9 is a flowchart explaining the procedure for allocating tasks to threads.

In the flowchart of FIG. 9, the task management section 24 of the data collection unit 2-k adds to the task queue 24a tasks each constituted by the process (i.e., processing of process data) regarding each of the process control units allocated by the charge determination section 23 (step S401). That is, each task represents a series of collection, treatment, and storage of data regarding the process control unit allocated to the task in question. The task queue 24a works on a first-in first-out basis; the tasks are extracted in the order in which they were added to the task queue 24a.

The task management section 24 then determines whether there is a task in the task queue 24a (step S402). If there is a task in the task queue 24a, step S403 is reached; if there is no task in the task queue 24a, step S406 is reached.

Meanwhile, using the thread pool 25a, the execution control section 25 of the data collection unit 2-k performs pooled management of a predetermined number of executable threads among the threads possessed by the execution unit 12. Thus if it is determined in step S402 that there exists a task in the task queue 24a, the execution control section 25 determines whether there is an allocatable thread in the thread pool 25a (step S403). If there is an allocatable thread in the thread pool 25a, step S404 is reached; if there is no allocatable thread in the thread pool 25a, step S402 is reached again.

If there is a task in the task queue 24a and if there is an allocatable thread in the thread pool 25a ("YES" in determination in step S403), the task is extracted from the task queue 24a on a FIFO basis and allocated to an available thread (step S404). At this point, the allocated task is deleted from the task queue 24a, and the task-allocated thread is marked "allocated" (to which no other task is allocatable) and removed from the thread pool 25a (step S405). In the example of FIG. 11, a task Tas4 is extracted from the task queue 24a, an available thread Thr4 is extracted from the thread pool 25a, and the extracted task Tas4 is allocated to the extracted thread Thr4 for execution on the processing resource 35-1 of the execution block 12, for example.

If there is no allocatable thread in the thread pool 25a ("NO" in determination in step S403), steps S402 and S403 are repeated. In this manner, the execution control section 25 waits for at least one thread to be returned to the thread pool 25a as an allocatable thread.

If all tasks have been allocated to threads and the task queue 24a is empty ("NO" in determination in step S402), the execution control section 25 waits for all threads to be returned to the thread pool 25a as allocatable threads (step S406), before terminating this procedure.

Explained next in reference to the flowchart of FIG. 10 is the procedure for a task-allocated thread to execute the task in question before allowing the thread to return to the thread pool 25a as a task-reallocatable thread. When allocated a task, the thread executes the task by performing a series of collection, treatment, and storage of data regarding the process control unit (data source) corresponding to the task in question (step S501).

Regardless of task execution being successful or unsuccessful (e.g., a failure to communicate with the process control unit (data source) as the data collection destination), the thread is marked "deallocated" (to which another task may be allocated) and returned to the thread pool 25a (step S502). In the example of FIG. 11, if the execution of a task Tas1 is terminated on the processing resource 35-4 in the execution unit 12, the task Tas1 is deallocated from the thread Thr1, and the thread Thr1 is returned to the thread pool 25a as an available thread.

Each task is allocated to a thread, executed, and deallocated from the thread as described above. When the task queue 24a becomes empty, all threads are marked "allocatable" and returned to the thread pool 25a, and the procedure is terminated. However, upon elapse of a predetermined wait time, it is preferred for the charge determination section 23 to again determine the process control units to be taken charge of by the data collection unit 2-k of interest.

For example, if the number of the process control units (data sources) to be allocated to the data collection unit 2-k is relatively small compared with the number of threads in the thread pool 25a, establishing such a predetermined wait time makes it possible to avoid overloading the target process control units (data sources) continuously requested for data collection. The wait time may be varied (or reduced to zero) depending on the performance of the target process control units (data sources) and on the real-time properties required of the target process data.

The procedure for controlling task execution based on processing history information is explained below in reference to the flowchart of FIG. 12. In the ensuing description, the time-series data or historical data will be generically referred to as trend/historical data. In FIG. 4, the last sequences/timestamps managed by trend/historical data category are shown composed of the sequence numbers (serial numbers), timestamps (times of day), etc., of the process control units (data sources) in effect after the units were activated. These data items correspond to the processing history information (i.e., information that uniquely identifies the order in which data was generated) included in the trend/historical data to be collected, indicating how much the data of interest has been completed when processed over time (i.e., a series of collection, treatment, and storage of data).

When a task-allocated thread starts processing the task in step S501 of FIG. 10, the data processing history management section 26 of the data collection unit 2-k determines whether there exists a trend/historical data category to be acquired next by referencing the process control unit management table 32 (step S601). If there is no trend/historical data category to be acquired next, the procedure of FIG. 12 is terminated. If there is a trend/historical data category to be acquired next, the data processing history management section 26 acquires the last sequence/timestamp of each trend/historical data category (step S601).

The data processing history management section 26 then designates the acquired last sequence/timestamp and requests the trend/historical data subsequent thereto from the target process control unit (data source)(step S603). Meanwhile, upon receipt of the data request, the process control unit (data source) returns the data chronologically subsequent to the designated last sequence/timestamp (step S611).

Figure 12:
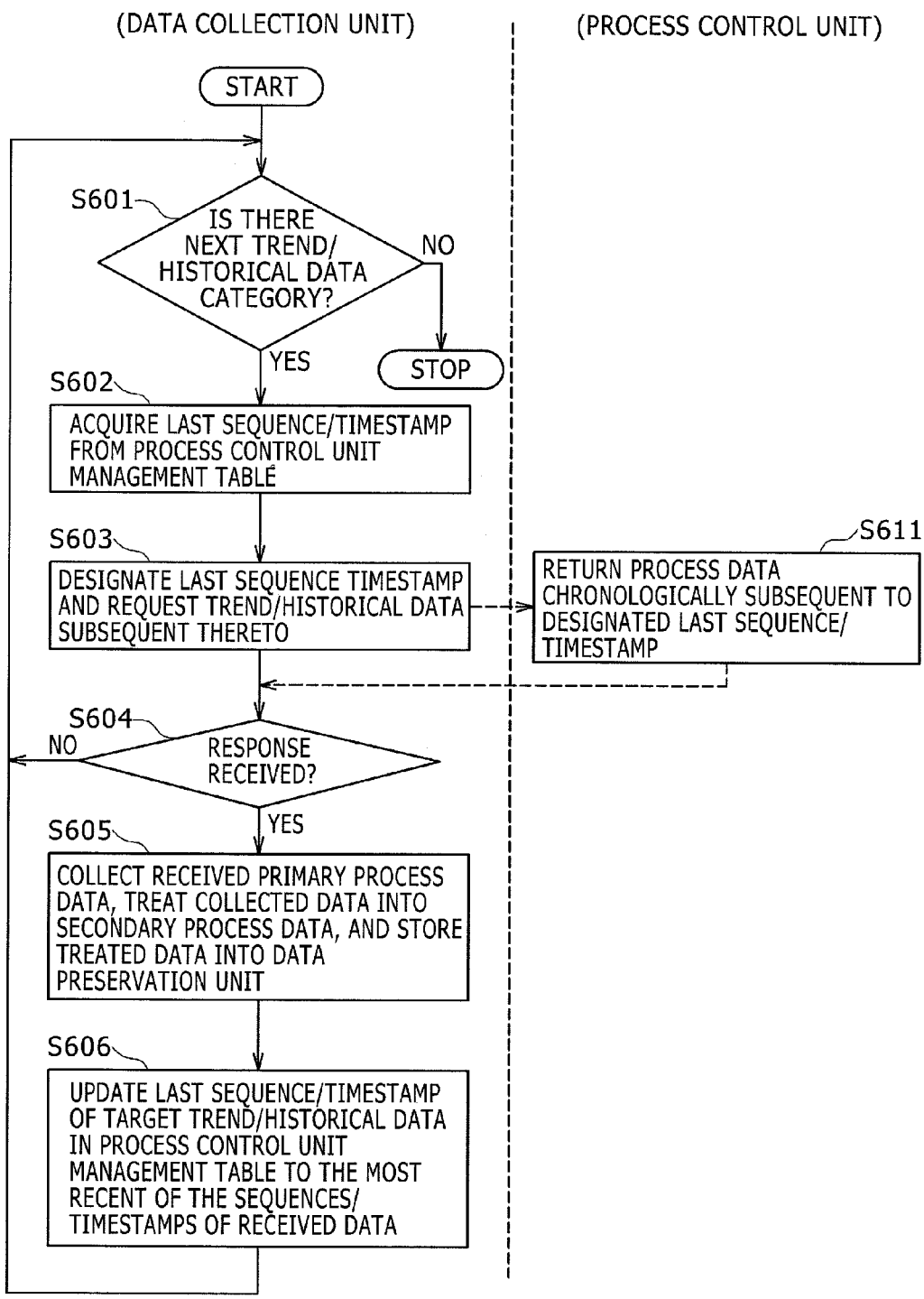
FIG. 12 is a flowchart explaining the procedure for controlling task execution based on processing history information.
Figure 13:
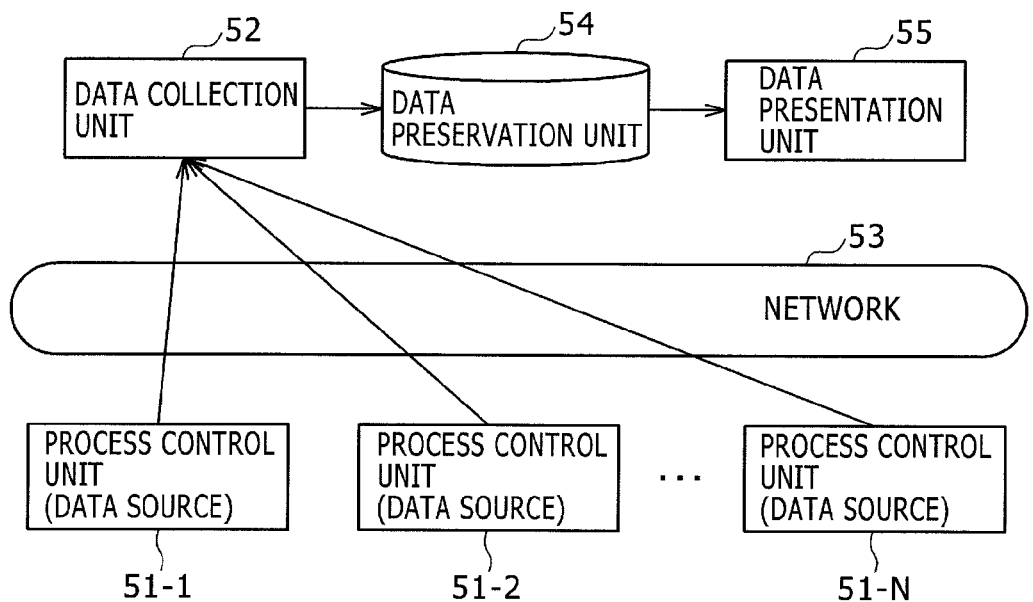
FIG. 13 is a block diagram of a typical configuration of an information processing system (first related-art example) that collects data.
Figure 14:
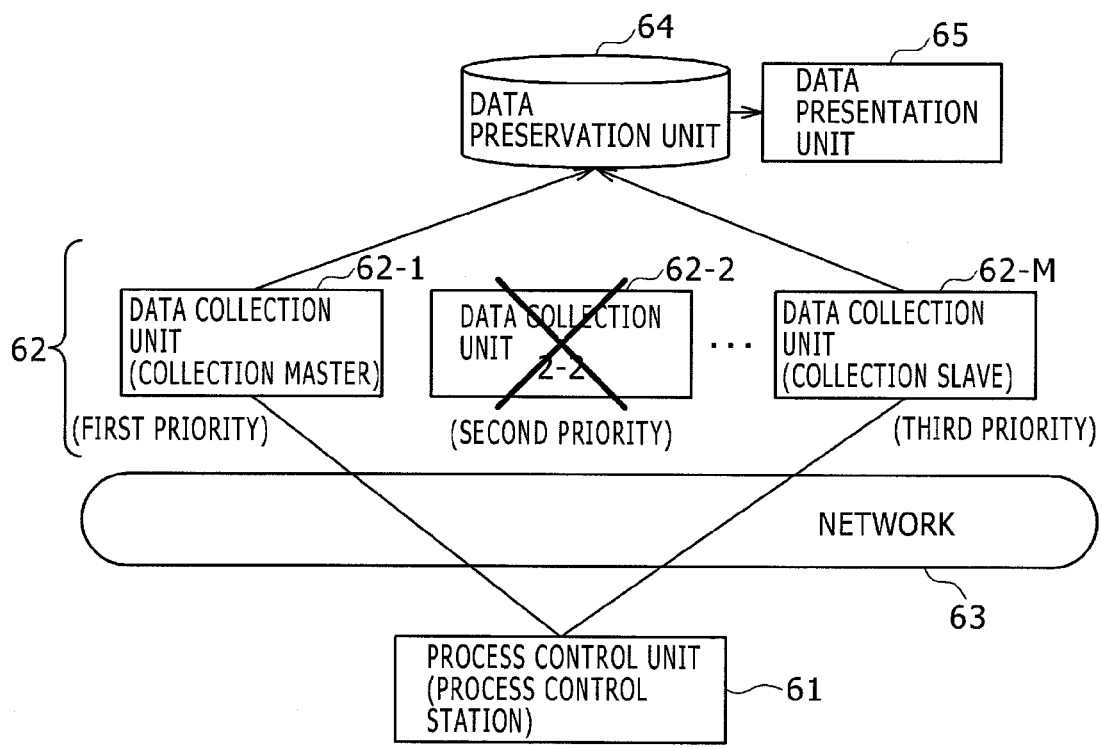
FIG. 14 is a block diagram of an information processing system as a second related-art example.
Figure 15:
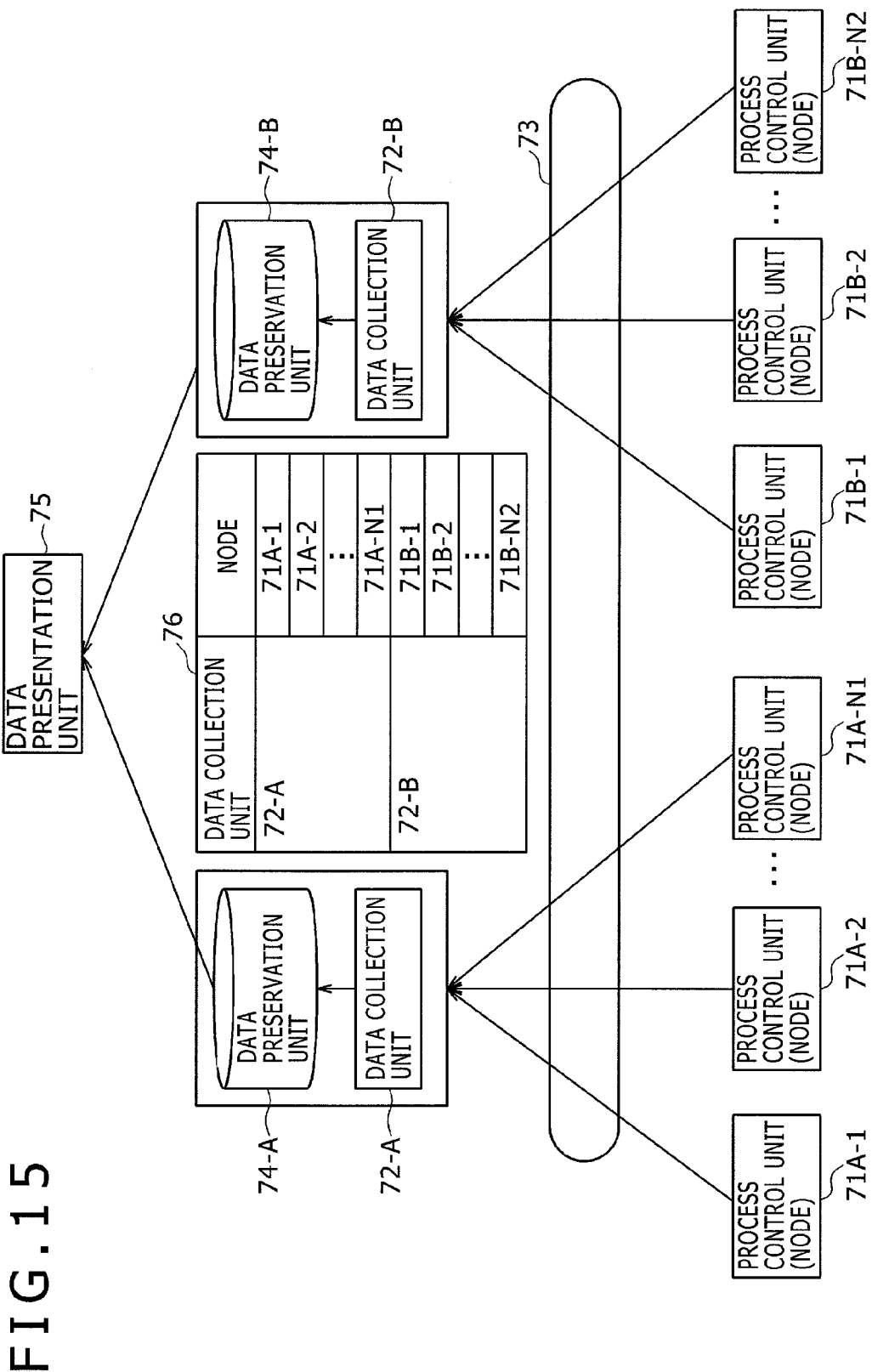
FIG. 15 is a block diagram of an information processing system as a third related-art example.

Although not shown in FIG. 12, there may be a case in which, when a task is executed for the first time after the information processing system was activated, the last sequence/timestamp of the data category in question does not exist in the process control unit management table 32. In such a case, the data collection unit 2-$k$ may set the sequence/timestamp to the time of, say, sequence 0/system startup point so that the target process control unit may return all data.

After making the data request, the data collection unit 2-$k$ determines whether the data processing history management section 26 has received a response within a predetermined time period from the process control unit (step S604). If there is no response from the data collection unit within the predetermined time period, the data processing history management section 26 returns to step S601 and determines whether there exists any trend/historical data category to be acquired next.

Upon receipt of the response emanating from step S611, the data collection unit 2-$k$ treats the received primary process data into secondary process data and stores the treated data into the data preservation unit 4 (step S605).

Upon completion of the task processing above, the data processing history management section 26 updates the last sequence/timestamp of the trend/historical data targeted in the process control unit management table 32 to the most recent of the sequences/timestamps of the received primary process data (step S605). This allows the data processing history management section 26 to request, when processing a task next time, the chronologically subsequent data from the process control unit so as to carry out a chronologically consistent continuation process.

As explained above, the information processing system of this embodiment includes the process control unit group 1 (N process control units 1-1 through 1-N) retaining process data including present value and time-series data or historical data, and the data collection unit group 2 (M data collection units 2-1 through 2-M) collecting process data from the process control unit group 1 over the network and treating the collected data. The first dynamic management section 21 of the data collection unit 2-$k$ ($k$=1 to M) manages access or exit of this data collection unit to or from the information processing system and the operating status of all data collection units currently accessing the information processing system (first dynamic management step). The second dynamic management section 22 manages the addition or removal of the process control unit group 1 to or from the information processing system (second dynamic management step). The charge determination section 23 determines the process control units to be taken charge of by the data collection unit of interest based on the first identification information allocated to the data collection unit group 2 and on the second identification information allocated to the process control unit group 1 (charge determination step).

Specifically, the data collection unit 2-$k$ possesses the data collection unit management table 31 that stores the first identification information and address of each data collection unit 2-$k$ and the status information indicating the operating status of each data collection unit. The first dynamic management section 21 manages the operating status of all data collection units by updating the data communication unit management table 31 through communication with the other data collection units. The data collection unit 2-$k$ also possesses the process control unit management table 32 that stores the second identification information and address of each process control unit and the processing history information possessed by each process control unit by data category. The second dynamic management section 22 updates the process control unit management table 32 through communication with all process control units, thereby managing the addition or removal of all process control units to or from the system.

As described, the processing of the process data from N process control units 1-1 through 1-N is allocated to M data collection units 2-1 through 2-M. This makes it easy to distribute the loads of processing among the data collection units.

Also, the access or exit of the data collection unit 2-$k$ to or from the information processing system may be carried out on the side of the data collection unit 2-$k$. Processing performance (i.e., how often data may be collected from the process control units, treated, and stored) may be represented by the ratio (balance) of the process control unit count N to the data collection unit count M. Thus raising, the data collection unit count M can boost processing performance dynamically and easily and shorten the intervals at which data is collected. That is, when the number of process control units is increased in the information processing system, dynamically raising the data collection unit count M can adjust processing performance dynamically in keeping with the process control unit count N.

Furthermore, the process control units to be taken charge of by a given data collection unit are determined not in centralized fashion by a particular unit but autonomously by each data collection unit 2-$k$. This makes it possible to ensure high reliability of the system without creating a bottleneck in its processing.

Also, the information processing system of this embodiment uses the task management section 24 to manage processing of process data as tasks (task management step). The execution control section 25 performs pooled management of a predetermined number of executable threads or processes from among the threads or processes possessed by the execution block 12 which performs processing of process data in the data collection unit 2-$k$, so as to allocate each task extracted successively from the task management side to a given thread or process (execution control step).

As described above, the number of threads or processes under pooled management can be raised or lowered by changing the settings involved, which makes it easy t level the loads of processing within or among the data collection units. For example, raising the thread or process count boosts the data collection performance of the data collection unit 2-$k$ but increases the resources to be used (CPU, memory, etc.); lowering the thread or process count reduces the data collection performance of the data collection unit 2-$k$ but reduces the resources to be utilized. The freed resources may then be allocated to processes other than data collection.

In the manner discussed above, the information processing system of this embodiment can distribute and level processing loads among the configured data collection units in collecting, treating, and storing process data. It is thus possible to implement the information processing system and the processing method for use therewith whereby processing performance is enhanced dynamically and easily while process data is being collected, treated, and stored.

Also, the information processing system of this embodiment uses the process control unit management table 32 to retain the processing history information (last sequence/timestamp) indicating by data category how much the data of interest as time-series data or historical data within the process data has been completed when processed over time. The system causes the data processing history management section 26 to perform a chronologically consistent continuation process upon execution of a task based on the processing history information and to update the processing history information at the end of task execution (data processing history management step).

As described, it is possible to request chronologically continuous data from the process control units based on the processing history information, whereby a chronologically consistent continuation process may be performed. As a result, any duplication of process data as well as duplicate processing of such process data can be averted.

It should be understood that the present invention when embodied is not limited to the above-described embodiments and that various modifications, variations and alternatives may be made of the invention so far as they are within the scope of the appended claims or the equivalents thereof.

What is claimed is:

1. An information processing system comprising:
   at least one micro-processor unit (MPU) and memory implementing:
      a plurality of process control units which store process data including present value and time-series data or historical data; and
      a plurality of data collection units which collect the process data from the plurality of process control units over a network and which process the collected process data;
   wherein the at least one micro-processor unit (MPU) and memory implement the data collection units to each include:
      a storage block which have a data collection unit management table storing a first identification information and status information indicating the operating status of the data collection unit of interest, and a process control unit management table storing a second identification information and the processing history information processed by data category by the process control unit of interest,
      a control block which have a first dynamic management section which manages access and exit of the data collection unit of interest to and from the information processing system and manages operating status of all the data collection units currently accessing the information processing system by successively updating the registered content of the data collection unit management table,
      and a second dynamic management section which manages the addition and removal of the plurality of process control units to and from the information processing system by successively updating the registered content of the process control unit management table, and a charge determination section which extracts currently operating data collection units from the data collection unit management table and makes a list of the data collection unit group, and extracts process control units currently accessing the information processing system from the process control unit management table and make a list of the process control unit group, and allocates the first identification information of the data collection unit to the second identification information of the process control unit, and determines the process control units to be taken charge of by the data collection unit.

2. The information processing system according to claim 1, wherein the data collection units each include:
   an execution block which has a plurality of processing resources and performs processing on the process data;
   a task management section which manages the processes on the process data as tasks; and
   an execution control section which performs pooled management of a predetermined number of executable threads or processes from among the threads or processes possessed by the execution block so as to allocate each task extracted successively through the task management section to a given thread or process.

3. The information processing system according to claim 2, wherein said data collection units each include a data processing history management section which stores processing history information indicating by data category how much the time-series data or the historical data within the process data has been completed when processed over time, the data processing history management section further performing a chronologically consistent continuation process upon execution of a task based on the processing history information, the data processing history management section further updating the processing history information at the end of the task execution.

4. A processing method for use with an information processing system including: at least one micro-processor unit (MPU) and memory implementing: a plurality of process control units which store process data including present value and time-series data or historical data; and a plurality of data collection units which collect the process data from the plurality of process control units over a network and which process the collected process data;
   the at least one micro-processor unit (MPU) and memory implementing the processing method comprising causing each of the data collection units to implement:
      a storage block which have a data collection unit management table storing a first identification information and status information indicating the operating status of the data collection unit of interest, and a process control unit management table storing a second identification information and the processing history information processed by data category by the process control unit of interest,
      a control block which have a first dynamic management step for managing access and exit of the data collection unit of interest to and from the information processing system and managing operating status of all the data collection units currently accessing said information processing system by successively updating the registered content of the data collection unit management table,
      and a second dynamic management step for managing the addition and removal of the plurality of process control units to and from the information processing system by successive updating the registered content of the process control unit management table,
      and a charge determination step which extracts currently operating data collection units from the data collection unit management table and makes a list of the data collection unit group, and extracts process control units currently accessing the information processing system from the process control unit management table and make a list of the process control unit group, and allocates the first identification information of the data collection unit to the second identification information of the process control unit, and determines the process control units to be taken charge of by the data collection unit.

5. The processing method for use with an information processing system according to claim 4,
the processing method further comprising causing each of the data collection units to carry out:
a task management step for managing processes on the process data as tasks; and
an execution control step for performing pooled management of a predetermined number of executable threads or processes from among the threads or processes possessed by an execution block which performs processing of process data in each of the data collection units, so as to allocate each task extracted successively in the task management step to a given thread or process.

6. The processing method for use with an information processing system according to claim 5,
the processing method further comprising causing each of the data collection units to carry out a data processing history management step for storing processing history information indicating by data category how much the time-series data or the historical data within the process data has been completed when processed over time, the data processing history management step further performing a chronologically consistent continuation process upon execution of a task based on the processing history information, the data processing history management step further updating the processing history information at the end of the task execution.

* * * * *